Sept. 11, 1923.

A. C. BECKWITH

AUTOMATIC CONTROLLING DEVICE

Filed July 24, 1919     5 Sheets-Sheet 1

Witnesses:
W. F. Kilroy
Harry R. L. White

Inventor:
Arthur C. Beckwith
By Hill & Hill
Attys.

Patented Sept. 11, 1923.

1,467,418

UNITED STATES PATENT OFFICE.

ARTHUR C. BECKWITH, OF CHICAGO, ILLINOIS, ASSIGNOR TO CHICAGO LUBRICATOR COMPANY, OF CHICAGO, ILLINOIS, A CORPORATION OF ILLINOIS.

AUTOMATIC CONTROLLING DEVICE.

Application filed July 24, 1919. Serial No. 312,956.

*To all whom it may concern:*

Be it known that I, ARTHUR C. BECKWITH, a citizen of the United States, residing at Chicago, in the county of Cook and State of Illinois, have invented certain new and useful Improvements in an Automatic Controlling Device, of which the following is a description.

My invention belongs to that general class of apparatus known as automatic controlling devices, and relates particularly to an automatic fluid pressure controlling device which may be used conjointly with other apparatus so as to automatically control or operate the same by controlling the supply or exhausting of a fluid under pressure to and from desired apparatus. The device might be termed an automatically controlled transfer mechanism arranged to permit or control the supplying or exhausting of a suitable fluid to the desired apparatuses, so as to control the operation thereof in a predetermined manner. The invention has among its objects the production of a device of the kind described that is simple, convenient, durable, compact, efficient, dependable and satisfactory for use wherever it may be found applicable. More particularly it has as an object the production of a device which may be applied to and cooperate with machinery or apparatus of various kinds, as for example an engine, for controlling the various kinds of associated apparatus while the engine is running, and automatically controlling the same when the engine is stopped. Many other objects, advantages and uses of the device herein shown and described will be obvious to those skilled in the art from the disclosure herein given. The present device is in the nature of an improvement over the automatic fluid pressure controlling devices shown in my pending application serial No. 239,808, filed June 13, 1918.

To this end my invention consists in the novel construction, arrangement and combination of parts herein shown and described, and more particularly pointed out in the claims.

In the drawings, wherein like reference characters indicate like or corresponding parts.

It may be first mentioned, in order that the device may be more clearly understood, that the apparatus in itself does not manufacture or produce fluid pressure, but it releases or controls the transfer of fluid from one or several devices to another or to several for the control or operation of said apparatuses or devices automatically, or to transmit fluid pressure for any other purpose desired, as well as to shut off the supply of fluid and permit its exhausting from the apparatus when the engine or other source of power is stopped. It may also be mentioned that in the drawings, the reference character N, wherever shown in the sketches, indicates air or other fluid under pressure from a suitable source of supply, and that P, wherever shown, indicates compressed air or other fluid which has been or is to be expanded or discharged, as hereafter described, for the control or operation of the fluid pressure operated controlling devices.

Referring to the drawings, 1 represents a suitably chambered part, it being understood that the part is made or constructed in such manner as to be most economical both in the manufacture as well as in the assembling of the various parts hereafter specified. The part 1 is provided with one or more chambers, as shown, two chambers A and B, divided by a partition 5. Communicating with the chambers A and B are one or more chambered parts 3 and 4. Chambered parts 2 are controlled and connected with the apparatus to be controlled, as will be more fully set forth hereinafter, while the mechanism within the parts 3 and 4 controls the transferring of the fluid from the chambers A and B and to chambered parts 2.

Figure 1:
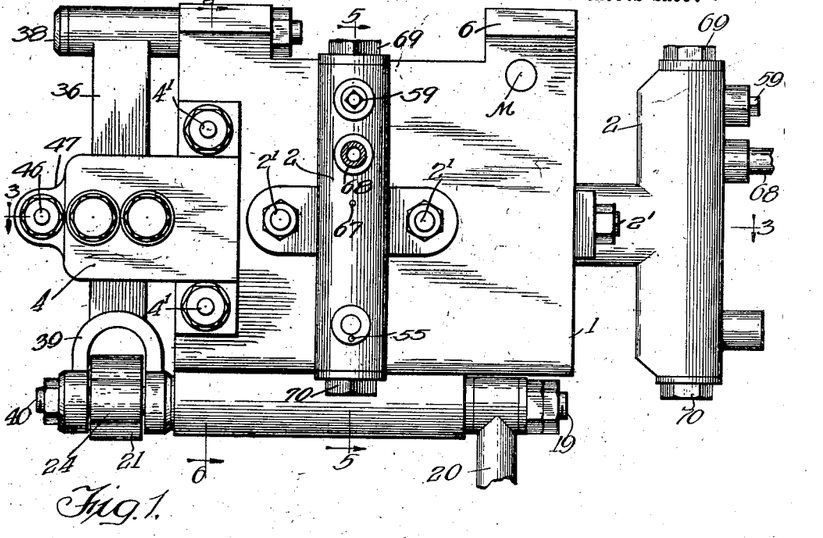
Fig. 1 is a side elevation of my improved device.
Figures 3, 7, 8, 9, 10:
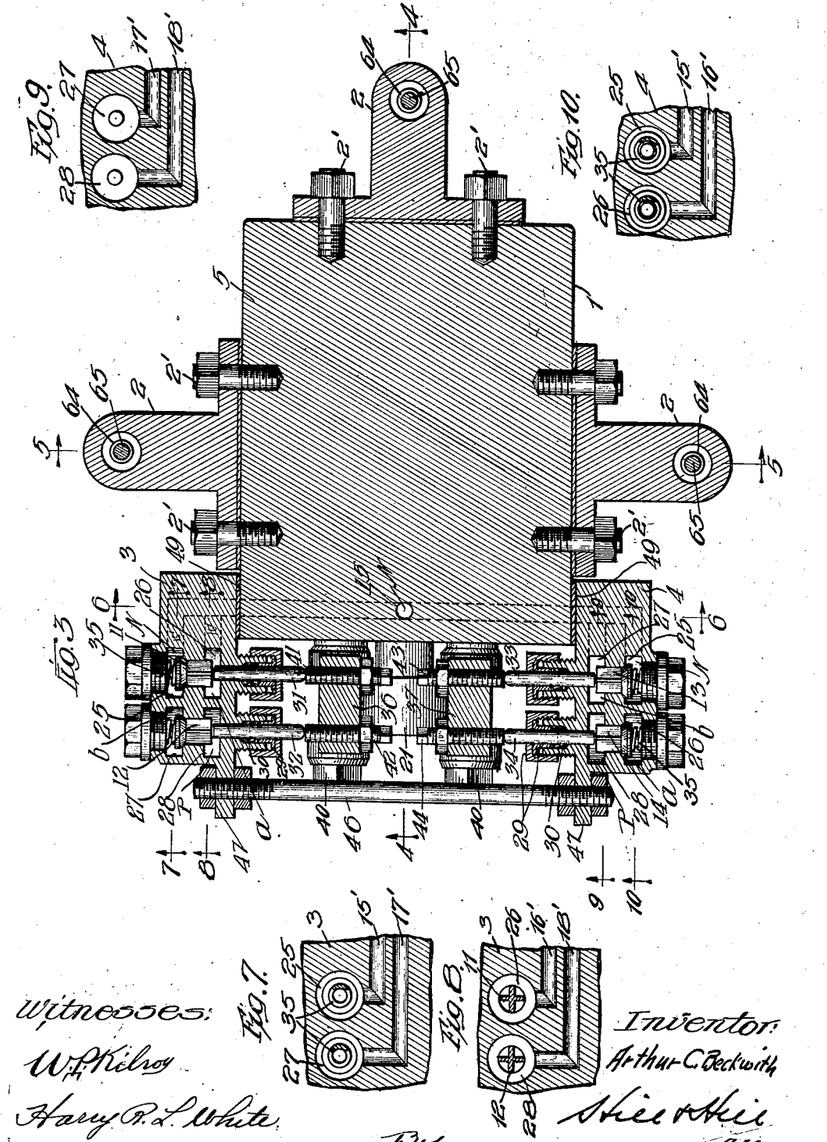
Fig. 3 is a sectional view taken substantially on line 3—3 of Figs. 1, 2, 4, 5 and 6.
Figs. 7, 8, 9 and 10 are sectional views taken substantially on lines 7—7, 8—8, 9—9 and 10—10 of Fig. 3.
Figure 6:
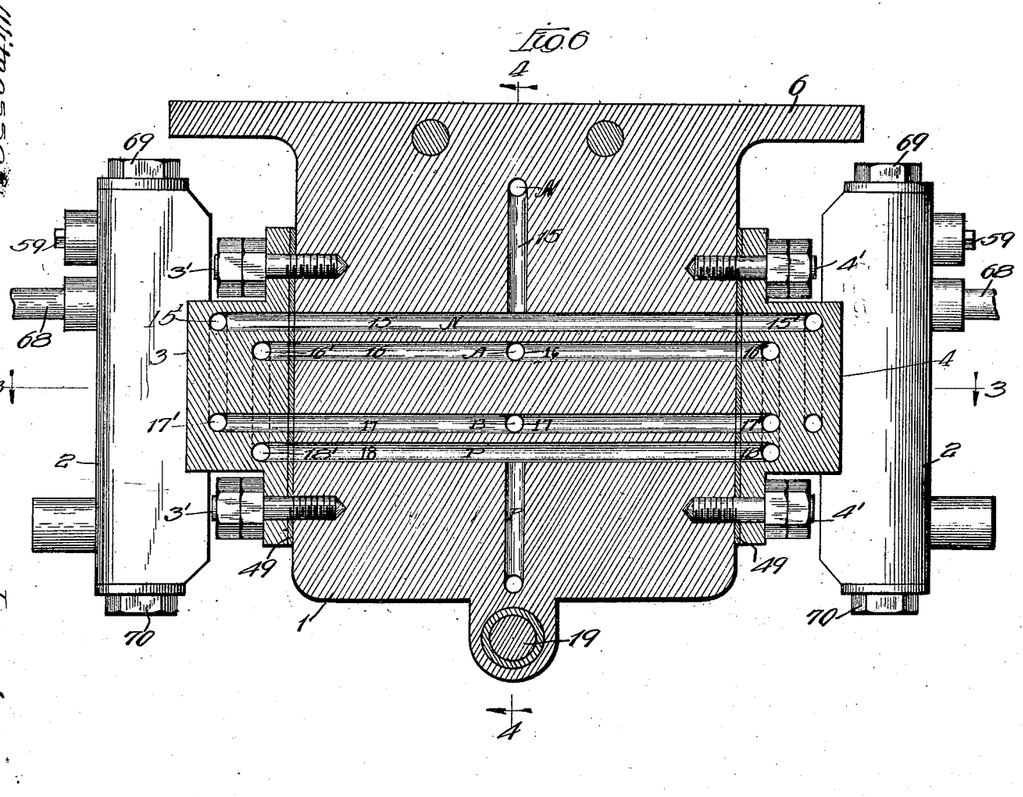
Fig. 6 is a sectional view taken substantially on line 6—6 of Figs. 1, 3 and 4.

The parts 3 and 4 are secured to the chambered part 1 by means of the studs 3' and 4' and suitable nuts, or equivalents for the purpose. The parts 3 and 4 are provided with chambers 25, 26, 27 and 28 (see Fig. 3), communication between chambers 25 and 26 and between 27 and 28 in part 3 being controlled by the valves 11 and 12, while chambers 25 and 27 in part 4 are arranged to communicate and chambers 26 and 28 arranged to communicate, communication, however, being controlled by the valves 13 and 14. As will be most clearly seen by referring to Fig. 4, chambers A and B communicate with ports or ducts 16 and 17, which are shown provided in the part 1. The ducts or ports are alternately intake and discharge ports, these ducts branching, as shown in Fig. 6, and connecting with ducts 16' and 17' in part 3, which communicate with the chambers 26 and 27 (see Figs. 7 and 8). The same also communicate with ducts 16' and 17' communicating with chambers 26 and 27 in part 4 (see Figs. 9 and 10). The part 1 is also provided with ducts 15 and 18 which connect with the parts 2, as will be hereafter described, and with the chambers in parts 3 and 4. Duct 15 connects with the ducts 15', communicating with the chamber 25 in part 3 and chamber 25 in part 4, while duct 18 communicates with duct 18' communicating with the chamber 28 in part 3, and also with duct 18' communicating with chamber 28 in part 4. The duct 15 (see Fig. 4) is provided with an inlet port M through which a suitable fluid, such as air under pressure, is supplied to the device. In Fig. 1 the inlet M is shown to which a supply pipe extends from any suitable source of fluid under pressure. The valves 11, 12, 13 and 14 are normally maintained shut by springs 35 or the equivalents for the purpose.

Figure 2:
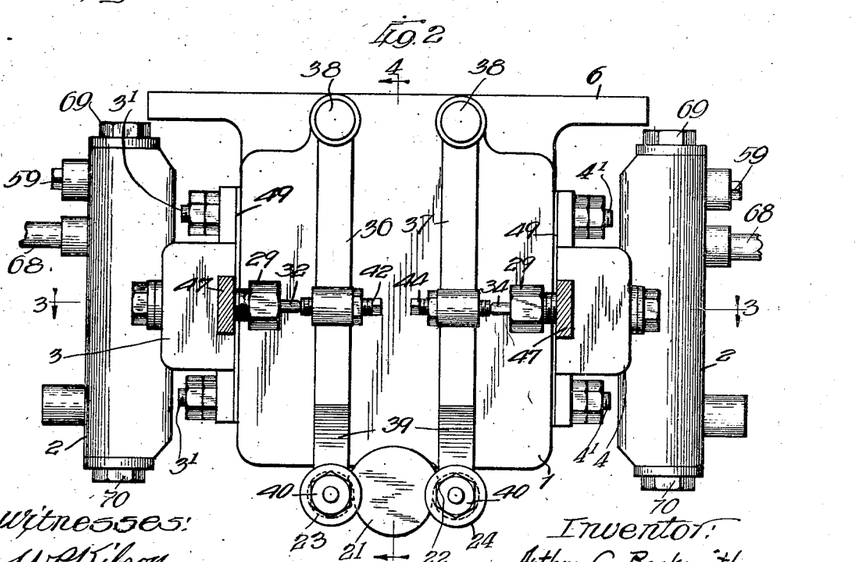
Fig. 2 is also a view in elevation of another side brace rod 46 removed.
Figure 4:
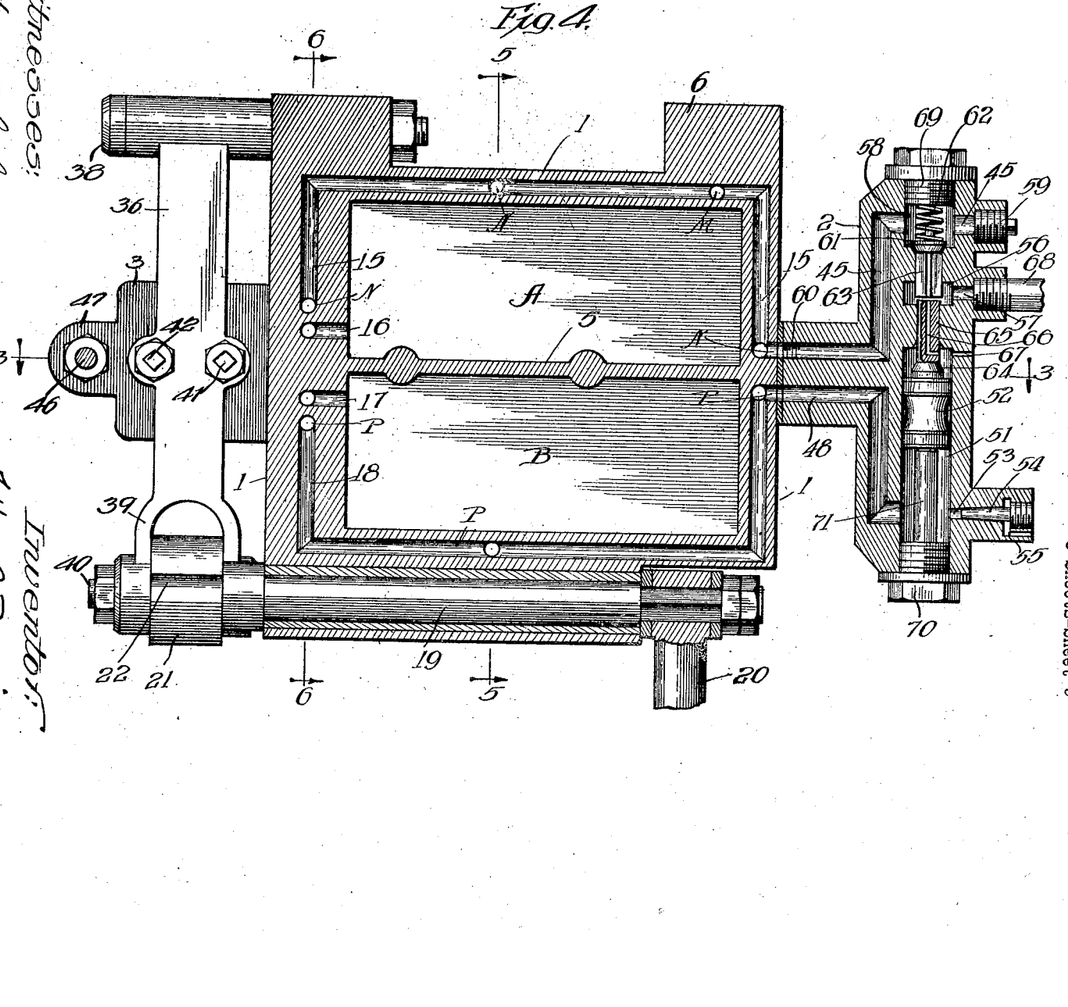
Fig. 4 is a sectional view taken substantially on line 4—4 of Figs. 2, 3, 5 and 6.
Figure 5:
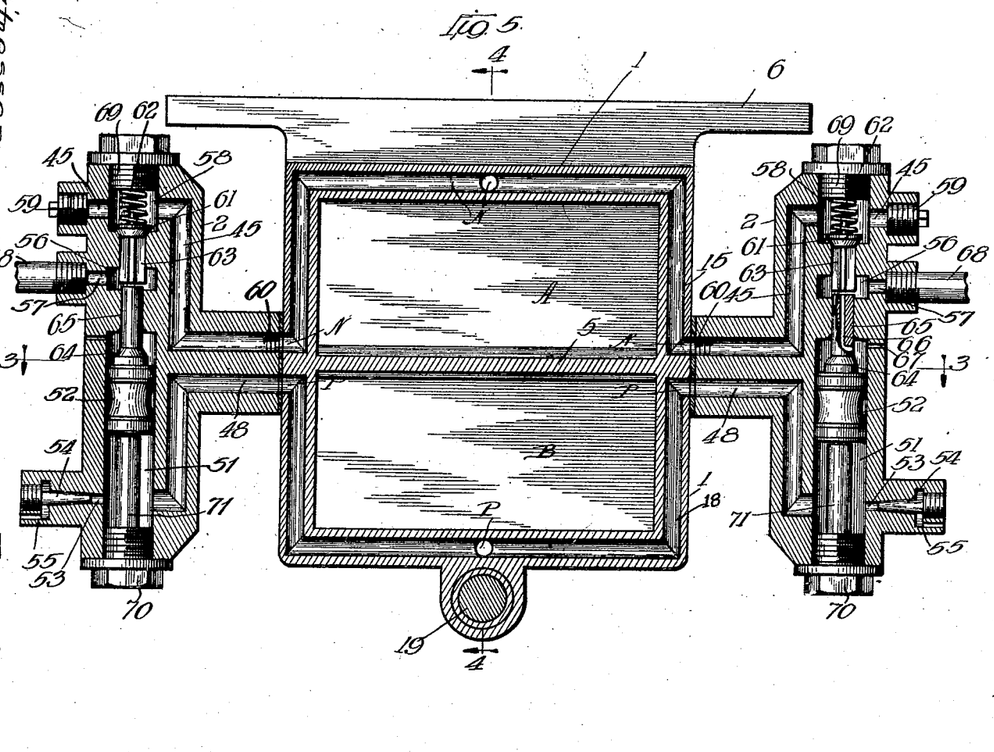
Fig. 5 is a sectional view taken substantially on line 5—5 of Figs. 1, 3 and 4.

The valves 11, 12, 13 and 14 are controlled or actuated by means of the members 31, 32, 33 and 34, which preferably extend through stuffing boxes consisting of the parts 29 and suitable packing material 30. To operate the members 31, 32, 33 and 34, I provide a pair of arms 36 and 37, which are preferably pivotally supported at 38. These arms carry rollers 23 and 24 arranged to cooperate with the cam member 21, which is preferably formed with the shoulders 22 (see Fig. 2), so that as the cam is rocked or partially rotated first in one direction and then in the other, the members 36 and 37 will be moved first in one direction and then in the other. (The result will be the same if the cam is rotated). It may be mentioned that in the drawings I have shown the parts in neutral position. In order to provide an adjustment, I arrange the adjustable members 41, 42, 43 and 44 arranged to cooperate with the members 31, 32, 33 and 34, so that the valves 11, 12, 13 and 14 may be controlled in a desired manner. Referring to Figs. 1 and 4, cam 21 is arranged to be operated by a rock shaft 19 which is rocked by means of arm 20 or its equivalent for the purpose. The shaft 19 may be arranged to be actuated in any preferred manner, this depending upon the installation of the device.

Ordinarily the end of arm 20 (only a portion of the arm being shown) is connected to a suitable reciprocating part.

Inasmuch as my device is particularly adaptable and suitable for use on steam engines, I shall describe its installation in that connection, but do not of course consider its use is so limited. When the same is used on a steam engine, I preferably connect the free end of the arm 20 to some part of the engine which will actuate the arm and cause shaft 19 to be rocked. For convenience it may be stated that arm 20 may be connected with the main valve stem of the engine. As the shaft 19 is rocked, the cam 21 will actuate the arms 36 and 37, causing one set of valves in the parts 3 or 4 to be operated, while the springs 35 at the opposite side, as well as pressure, will close the valves. In locomotive service the main valve travel is not uniformly even at all times due to cutting off the supply of steam to the cylinder early in the piston stroke. When desired to use the steam expansively, this means that the main valve and short cut-off may only travel a little more than its lap and lead, say for illustration two and one-half inches, while in full gear it will travel several inches, and at other times will travel any distance between full gear and short cut-off. The present device is so arranged that any movement made by the engine valve in either direction from its central position will operate one or the other sets of valves in the parts 3 and 4, and a long or short main valve travel will not in any way affect or vary the operation of the device. I have shown the parts 3 and 4 connected by a rod 46 extending between the extensions 47, the same bracing and securing the parts against warping.

The mechanism arranged to be controlled by the mechanism just described is in itself a controlling mechanism which controls other apparatus. The mechanism which I have illustrated arranged in the casings 2 is substantially similar to the mechanism described in my prior application referred to.

Referring particularly to Fig. 4, it being understood that the description for one will suffice for the three, which as illustrated, are similar, casing part 2 is provided with ducts 45 and 48 communicating with ducts 15 and 18. The part is provided with a chamber 51 in which is arranged a plunger 52, the same being slidable therein and arranged to be controlled by the pressure from one of the chambers A or B. The part is provided with a leakage port 53, the passage of fluid therethrough being controlled by the valve 54 which regulates the rate of flow of fluid that may escape through the duct 55. Part 2 is also provided with chambers 56 and 58. The chamber 56 is provided with a port 57, which at times is a discharge port and at other times an intake port, depending upon whether fluid is discharged into pipe 68 or to be exhausted or discharged therefrom. It may be mentioned that pipe 68 is connected with suitable apparatus, not shown, arranged to be controlled or operated by compressed air or other fluid under pressure. It is immaterial what apparatus or apparatuses, as several may be controlled from the same source, are to be controlled. Chamber 58 communicates with the duct 45. The chambers 58, 56 and chamber 51 beyond the plunger 52, all communicate, communication, however, being controlled by the valves 61 and 64, which valves cooperate as will be later described. The valve 61 is provided with a stem 63 of a length to engage with the stem 65 of valve 64, and valve stem 65 is shown provided with a duct 66 which will be normally closed when the valve is seated. The casing is provided with an exhaust port 67 from the chamber 51 on the side of the plunger 52 adjacent the valve 64, the plunger 52 substantially dividing the chamber 51 into two chambers. The valve 61 is normally maintained closed by a spring 62 bearing against the closure 69, and movement of plunger 52 is limited by the stem 71 on closure plug 70. I have shown the casing 2 provided with a port 45', which in the case shown is closed by a plug 59. It may be mentioned that plug 59 may be removed and port 45' arranged to communicate with the source of fluid supply under pressure. In this case duct 45 would ordinarily be closed by a plug inserted at 60 or in some equivalent manner.

In the preceding description, I have set forth how the several chambers are connected by the various ducts, and I have also mentioned what the characters N and P indicate. In order to facilitate understanding the construction and operation, I have placed these characters in the various ducts and chambers which are in communication. I have also, by the characters $a$ and $b$, indicated that chambers 26 and 27 are in communication with the chambers A and B. As before mentioned, port M communicates with a suitable source of fluid supply under pressure, and this may be air, oil, water or other fluid under or at a pressure. Chamber 58 is arranged to communicate with the port 15 so as to receive fluid under pressure, or to an independent source of fluid under pressure or otherwise by means of the duct 45'. This particular connection is immaterial in so far as the operation of the device is shown. If the pressure of the fluid N is suitable for use with the apparatus connected with pipe 68, then that fluid may be used. If it is not, then duct 45 will be closed up and a separate source of fluid be piped to the duct 45'. The pipe 68 may be connected to a hydrostatic or other lubricator, or to a control for valves, electric switch, and various other apparatus suitably constructed or arranged to be controlled by a suitable fluid by supplying fluid to or withdrawing the same from the apparatus as the case may be.

With the preceding understood, the operation of my device may be briefly described as follows: Fluid pressure being turned on and discharged through duct M into the duct 15, the same fills the chambers 25 in parts 3 and 4. It may be assumed that the cam 21 is turned (see Fig. 2) counter clockwise so that it has moved the arm 36 to operate the parts 41—42 and 31—32 and open valves 11 and 12. The fluid under pressure (N) passes valve 11 into chamber 26 and through duct 16' and duct 16 into chamber A, charging the same with fluid under pressure. It may be asusmed that chamber B is charged with fluid (P) under pressure, and this fluid can escape through duct 17 and duct 17' into chamber 27, past valve 12 into chamber 28, and through duct 18' and duct 18, where it will be discharged through duct 48 into the several chambers 51. The pressure (P) in chamber 51 will cause plunger 52 to close the valve 64, and this at the same time will open valve 61, so that fluid under pressure can flow through duct 15, duct 45, into chamber 58 and past valve 61 into chamber 56, and thence through port 57 and through pipe 68 to where desired, performing the desired work. It will be noted that valve 64 at this time is in its closed postioin so that no fluid can escape through port 67. As the cam 21 is rocked in the opposite direction (or completely rotated), arm 37 is rocked, springs 35 at the same time closing valves 11 and 12, and valves 13 and 14 are opened. Fluid under pressure (N) from ducts 15 can then pass through ducts 15 and 15' into chamber 25 in part 4, past valve 13 into chamber 27, and thence through 17' and duct 17 to chamber B, charging that chamber. Simultaneously, the fluid under pressure (P) from A flows through duct 16 into duct 16', into chamber 26, past valve 14 into chamber 28, through duct 18', into duct 18, and through duct 48 into chamber 51. Plunger 52 is therefore maintained in position to maintain valve 64 closed and pressure is continued in pipe 68. Of course, it should be understood that the amount of fluid actually transferred at each time into chamber 51 depends upon the setting of leakage port 54. The action is continued. If the apparatus actuating arm 20 and shaft 19 and cam 21 is stopped, then in this case pressure will gradually drop in chamber 51 owing to the leakage from the system of the fluid past valve 54, and the plunger 52 will be returned substantially as indicated in Fig. 4. Pressure on the valve 64 exerted through stem 65 will cause valve 64 to open, relieving the pressure in chamber 56 and pipe 68 through the duct 66 and port 67, (64 moving plunger 52), and spring 62 and pressure in chamber 58 will close and maintain valve 61 shut. The result will be the same regardless of at what point the cam 21 is left, that is, whether neutral or at one side, as the pressure will gradually drop in the chamber A or B as the case may be.

It will thus be seen that my device is arranged to control or permit the supplying and exhausting of a fluid to pipe 68 to and from the desired apparatus, the same releasing or controlling the transfer of fluid from one or several devices to another or several. It is thus possible and practical to cause certain apparatus associated with or remote from the engine or other device actuating shaft 19 to operate while the engine or apparatus is running, and stop while the engine or apparatus is stopped, or vice versa, to cause certain apparatus to be stopped while the engine is running, and will allow it to operate while the engine is stopped, this of course depending upon the particular controlling apparatus or apparatuses controlled in connection therewith. As has been brought out before, the device may transfer the same kind of fluid pressure used in its own operation or control, to-wit, that received through port M, or it may use one kind of fluid pressure in its control or operation, and control another kind. Generally I prefer to operate the device with compressed air and to use compressed air as the fluid pressure transferred for the controlling of other apparatus, but the device will operate on compressed air and transfer steam, water, or other fluid under pressure. On locomotive apparatus compressed air as a motive power for various operating or controlling devices is practically always available.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. A device of the character described, comprising a hollow part provided with a plurality of chambers therein, each of said chambers having a port, and means for simultaneously controlling all of said ports, said means comprising a plurality of valves for each chamber, and mechanically operated means for controlling said valves in a predetermined manner, whereby said ports are alternately intake and discharge ports.

2. A casing having chambers and provided with an inlet and outlet, said chambers communicating with said inlet and outlet, a plurality of mechanically operated valves for controlling the passage of fluid from said inlet through the casing to the outlet whereby the chambers will alternately charge and discharge, and means for actuating said valves and adjustably controlling their distance of travel.

3. A device of the kind described comprising a casing having chambers and provided with an inlet and outlet, each chamber having a port connected with said inlet and with said outlet, means for simultaneously interrupting the admission of fluid to one chamber and permitting its discharge through the said outlet, and permitting the admission to the other chamber and interrupting its discharge to the outlet, comprising an intake valve and discharge valve for each chamber, and means for simultaneously operating the intake valve for one chamber and the discharge valve for the other chamber, said casing having a second outlet connecting with the inlet and means controlled by the fluid passing through the casing for controlling passage of fluid through the second outlet.

4. A device of the kind described comprising a casing having a plurality of chambers therein and provided with an inlet and an outlet, and with a port for each chamber communicating with said inlet and outlet, and means for alternately controlling the passage of fluid in and out of the chambers comprising an intake and a discharge valve for each chamber, means for actuating said valves, and means for individually adjusting said last mentioned means.

5. A device of the kind described comprising a casing having a plurality of chambers therein and provided with an inlet and an outlet, and with a port for each chamber communicating with said inlet and outlet, and means for alternately controlling the passage of fluid in and out of the chambers comprising an intake and a discharge valve for each chamber, adjustable means for actuating said valves, and means for operating said adjustable means, an auxiliary casing attached to said casing and provided with an inlet communicating with said casing inlet, and with a second inlet and an outlet, and means controlled by the fluid entering through said first inlet in said auxiliary casing for controlling the fluid passing through the auxiliary casing.

6. A device of the kind described comprising a casing having a plurality of chambers therein and provided with an inlet and an outlet, and with a port for each chamber communicating with said inlet and outlet, and means for alternately controlling the passage of fluid in and out of the chambers, comprising an intake and a discharge valve for each chamber, adjustable means for actuating said valves, means for individually adjusting each of said adjustable means, and means for operating said adjustable means.

7. In a device of the kind described comprising a chambered part having a plurality of chambers each provided with a port, and means for simultaneously controlling said ports comprising a plurality of valves, slidable pins for actuating said valves, and mechanically operated means for controlling the movement of said pins in a predetermined manner, whereby the ports are alternately intake and exhaust ports.

8. In a device of the kind described comprising a chambered part having a plurality of chambers each provided with a port, and means for simultaneously controlling said ports comprising a plurality of valves, pins slidable to engage said valves, guides adapted to slidably receive said pins, and mechanically operated for controlling the movement of said pins in a predetermined manner, whereby the ports are alternately intake and exhaust ports.

9. In a device of the kind described comprising a chambered part having a plurality of chambers each provided with a port, and means for simultaneously controlling said ports comprising a plurality of valves, slidable pins for actuating said valves, means for adjusting the movement of said pins, and mechanically operated means for controlling the movement of said pins in a predetermined manner, whereby the ports are alternately intake and exhaust ports.

10. In a device of the kind described comprising a chambered part having a plurality of chambers each provided with a port, and means for simultaneously controlling said ports comprising a plurality of valves, slidable pins for actuating said valves, screw threaded adjusting members for varying the movement of said pins, and mechanically operated means for controlling the movement of said pins in a predetermined manner, whereby the ports are alternately intake and exhaust ports.

11. In a device of the kind described comprising a chambered part having a plurality of chambers each provided with a port, and means for simultaneously controlling said ports comprising a plurality of valves, slidable pins for actuating said valves, screw threaded members for individually adjusting the movement of each of said pins, and mechanically operated means for controlling the movement of said pins in a predetermined manner, whereby the ports are alternately intake and exhaust ports.

12. In a device of the kind described comprising a chambered part having a plurality of chambers each provided with a port, and means for simultaneously controlling said ports comprising a plurality of valves, mechanically operated means for controlling said valves in a predetermined manner, whereby the ports are alternately intake and exhaust ports, said operating means comprising a pivoted movable arm, and a cam for actuating said arm in a predetermined manner.

13. A device of the kind described comprising a casing provided with a plurality of chambers communicating with a common inlet and outlet port, means for controlling the passages of fluid from said inlet through said chambers and out through said outlets, comprising an intake valve for each chamber, and a discharge valve for each chamber independent of said intake valve, and mechanically operated means for simultaneously operating the intake valve of one chamber and the discharge valve of the other chamber.

14. A device of the kind described comprising a casing provided with a plurality of chambers communicating with a common inlet and outlet, and means for controlling the passages of fluid from said inlet through said chambers and out through said outlets, comprising an intake valve for each chamber, and a discharge valve for each chamber, and mechanically operated means for simultaneously operating the intake valve of one chamber and the discharge valve of the other chamber, said operating mechanism comprising movable members adapted to engage said valves, a cam for engaging said movable members whereby the intake valve of one chamber and the discharge valve of the other chamber will be simultaneously operated.

15. A device of the kind described comprising a casing provided with a plurality of chambers communicating with a common inlet and outlet, and means for controlling the passages of fluid from said inlet through said chambers and out through said outlets, comprising an intake valve for each chamber, and a discharge valve for each chamber, and mechanically operated means for simultaneously operating the intake valve of one chamber and the discharge valve of the other chamber, said operating mechanism comprising pivoted arms adapted to engage said valves, a cam for simultaneously engaging said movable members whereby the intake valve of one chamber and the discharge valve of the other chamber will be simultaneously operated.

16. A device of the kind described comprising a casing provided with a plurality of chambers communicating with a common inlet and outlet, and means for controlling the passages of fluid from said inlet through said chambers and out through said outlets, comprising an intake valve for each chamber, and a discharge valve for each chamber, and mechanically operated means for simultaneously operating the intake valve of one chamber and the discharge valve of the other chamber, said operating mechanism comprising pivoted arms adapted to engage said valves, a cam for simultaneously engaging said pivoted arms whereby the intake valve of one chamber and the discharge valve of the other chamber will be simultaneously operated, and adjustable means for controlling the movement of said valves.

17. A device of the kind described comprising a casing provided with a plurality of chambers communicating with a common inlet and outlet, and means for controlling the passages of fluid from said inlet through said chambers and out through said outlets, comprising an intake valve for each chamber, and a discharge valve for each chamber, and mechanically operated means for simultaneously operating the intake valve of one chamber and the discharge valve of the other chamber, said operating mechanism comprising pivoted arms adapted to engage said valves, a cam for simultaneously engaging said pivoted arms whereby the intake valve of one chamber and the discharge valve of the other chamber will be simultaneously operated, and adjustable means on said arms for individually controlling the movement of each of said valves.

In testimony whereof, I have hereunto signed my name in the presence of two subscribing witnesses.

ARTHUR C. BECKWITH.

Witnesses:
   Roy W. Hill,
   Charles I. Cobb.